(12) United States Patent
Honke et al.

(10) Patent No.: US 8,848,911 B2
(45) Date of Patent: Sep. 30, 2014

(54) CONTENT RECEIVING DEVICE, CONTENT REPRODUCING DEVICE, CONTENT RECEIVING AND REPRODUCING DEVICE, CONTENT RECEIVING METHOD, AND PROGRAM

(75) Inventors: Yuusuke Honke, Tokyo (JP); Shinya Uemachi, Tokyo (JP); Yoshinori Matsuda, Tokyo (JP)

(73) Assignee: Sumitomo Electric Networks, Inc., Tokyo (JP)

( * ) Notice: Subject to any disclaimer, the term of this patent is extended or adjusted under 35 U.S.C. 154(b) by 0 days.

(21) Appl. No.: 13/513,910

(22) PCT Filed: Nov. 29, 2010

(86) PCT No.: PCT/JP2010/071246
§ 371 (c)(1),
(2), (4) Date: Jul. 20, 2012

(87) PCT Pub. No.: WO2011/074398
PCT Pub. Date: Jun. 23, 2011

(65) Prior Publication Data
US 2012/0288091 A1 Nov. 15, 2012

(30) Foreign Application Priority Data
Dec. 14, 2009 (JP) ................................. 2009-283242

(51) Int. Cl.
*H04N 7/167* (2011.01)
*H04N 5/783* (2006.01)
*H04L 9/08* (2006.01)
*H04L 9/06* (2006.01)
*H04N 21/4405* (2011.01)
*H04N 21/236* (2011.01)
*H04N 21/434* (2011.01)
*H04N 9/804* (2006.01)
*H04N 9/82* (2006.01)
*H04N 5/913* (2006.01)

(52) U.S. Cl.
CPC ............... *H04N 5/913* (2013.01); *H04N 5/783* (2013.01); *H04L 9/0822* (2013.01); *H04L 2209/60* (2013.01); *H04N 9/8042* (2013.01); *H04N 9/8205* (2013.01); *H04L 9/065* (2013.01); *H04N 21/44055* (2013.01); *H04N 21/23605* (2013.01); *H04N 2005/91364* (2013.01); *H04N 21/232476* (2013.01); *H04N 21/4343* (2013.01)
USPC ........................................................ 380/210

(58) Field of Classification Search
None
See application file for complete search history.

(56) References Cited

U.S. PATENT DOCUMENTS

| | | | |
|---|---|---|---|
| 8,325,917 B2 * | 12/2012 | Yamamoto et al. | 380/201 |
| 2002/0116705 A1 | 8/2002 | Perlman et al. | |
| 2005/0047596 A1 * | 3/2005 | Suzuki | 380/239 |
| 2005/0259821 A1 * | 11/2005 | Kubota et al. | 380/228 |
| 2007/0025687 A1 * | 2/2007 | Kim | 386/68 |
| 2010/0189256 A1 * | 7/2010 | Doehla et al. | 380/217 |
| 2012/0008773 A1 * | 1/2012 | Westerveld | 380/220 |

FOREIGN PATENT DOCUMENTS

| | | | |
|---|---|---|---|
| EP | 1 143 722 | 10/2001 | |
| JP | 9-247623 | 9/1997 | |
| JP | 2005-287039 | 10/2005 | |
| JP | 2006-331483 | 12/2006 | |
| JP | 2008-539638 | 11/2008 | |
| JP | 2011091538 A * | 5/2011 | |
| WO | WO 2006/114759 | 11/2006 | |
| WO | WO 2006114759 A2 * | 11/2006 | H04N 7/167 |

OTHER PUBLICATIONS

Yamaguchi, Tetsuya, Tomoyuki Kanekiyo, Motoyuki Horii, Katsuhiko Kawazoe, and Fumio Kishino. "Highly efficient transmission system for digital broadcasting redistribution services over IP multicast networks." Consumer Electronics, IEEE Transactions on 54, No. 2 (2008): 920-924.*

* cited by examiner

*Primary Examiner* — Jeffrey Pwu
*Assistant Examiner* — Carlos Amorin

(74) *Attorney, Agent, or Firm* — Drinker Biddle & Reath LLP

(57) ABSTRACT

Provided is a content receiving device that can reduce processing loads at a time when an encrypted stream is decrypted. A video recording and reproducing device 5 includes: a receiving section 20 that receives a video stream in which data of a content containing video is divided into a plurality of TS packets; an extraction section 23 that extracts from the video stream, in a case where the video stream received by the receiving section 20 is an encrypted stream, a scramble key for decrypting the encrypted stream; a decryption section 24 that decrypts, by using the scramble key, only a specific packet among the plurality of TS packets; and an obtaining section 25 that obtains predetermined information of the video stream, based on data decrypted by the decryption section 24.

15 Claims, 9 Drawing Sheets

| PAT INFORMATION |
|---|
| PMT INFORMATION |
| ECM INFORMATION |
| ELAPSED-TIME INFORMATION |
| I-PICTURE INFORMATION |
| I-PICTURE INFORMATION |
| I-PICTURE INFORMATION |
| ELAPSED-TIME INFORMATION |
| I-PICTURE INFORMATION |
| I-PICTURE INFORMATION |
| I-PICTURE INFORMATION |
| ECM INFORMATION |
| ELAPSED-TIME INFORMATION |
| I-PICTURE INFORMATION |
| I-PICTURE INFORMATION |
| I-PICTURE INFORMATION |

⋮

CONTENT RECEIVING DEVICE, CONTENT REPRODUCING DEVICE, CONTENT RECEIVING AND REPRODUCING DEVICE, CONTENT RECEIVING METHOD, AND PROGRAM

TECHNICAL FIELD

The present invention relates to a content receiving device such as an STB (Set Top Box) that receives a content such as video, a content reproducing device, a content receiving and reproducing device, and a content receiving method, and a program.

BACKGROUND ART

For example, in a recording and reproducing device disclosed in Patent Literature 1, I-pictures (intra-frame coded images) are extracted by analyzing picture headers at the time of recording, and the extracted I-pictures are stored in a dedicated I-picture buffer which is different from a buffer used for ordinary reproduction. Then, when special reproduction (trick play) such as fast-forward is to be performed, the I-pictures read from the I-picture buffer are used to perform such fast-forward.

CITATION LIST

Patent Literature

[PTL 1] Japanese Laid-open Patent Publication No. H9-247623

SUMMARY OF THE INVENTION

Problems to be Solved by the Invention

In the recording and reproducing device disclosed in Patent Literature 1, when the recording and reproducing device is receiving an encrypted stream, it is necessary to decrypt the encrypted stream in order to analyze picture headers. At that time, if the entire encrypted stream is decrypted, processing loads are greatly increased.

The present invention is made in view of the above problem. An object of the present invention is to obtain a content receiving device, a content reproducing device, a content receiving and reproducing device, a content receiving method, and a program, which can reduce processing loads when an encrypted stream is decrypted.

Solution to the Problems

A content receiving device according to a first aspect of the present invention is directed to a content receiving device comprising: a receiving section that receives a stream in which data of a content containing video is divided into a plurality of packets; an extraction section that extracts, in a case where the stream received by the receiving section is an encrypted stream, a key for decrypting the encrypted stream from the stream; a first decryption section that decrypts, by using the key, only a specific packet among the plurality of packets; and an obtaining section that obtains predetermined information of the stream, based on data decrypted by the first decryption section.

In the content receiving device according to the first aspect, the first decryption section decrypts only a specific packet among a plurality of packets constituting an encrypted stream, and the obtaining section obtains predetermined information of the stream based on data decrypted by the first decryption section. Accordingly, when compared with a case where the entire encrypted stream is decrypted in order to obtain the predetermined information of the stream, it is possible to reduce processing loads at a time when the encrypted stream is decrypted.

The content receiving device according to a second aspect of the present invention which is based on the content receiving device according to the first aspect further includes: an encryption section that encrypts the key extracted by the extraction section, by using a unique key of the content receiving device, wherein the encrypted stream containing the key encrypted by the encryption section is recorded in a recording section.

In the content receiving device according to the second aspect, the encryption section encrypts the key extracted by the extraction section, by using a unique key of the content receiving device. Then, the encrypted stream containing the key encrypted by the encryption section is recorded in the recording section. Therefore, since the key that was once decrypted when being extracted from the stream is encrypted again by using the unique key, confidentiality of the key can be secured. Moreover, the encrypted stream received by the receiving section is recorded in the recording section. Therefore, when compared with a case where the encrypted stream is once decrypted, then encrypted again by use of the unique key, and then recorded, processing loads can be reduced.

In the content receiving device according to a third aspect of the present invention which is based on the content receiving device according to the first aspect, the content receiving device is connected to a predetermined local network, the content receiving device further includes: a second decryption section that decrypts, by using the key, the encrypted stream recorded in the recording section; a creation section that creates a new stream that suits the local network, based on the stream decrypted by the second decryption section; and a transmission section that transmits the new stream created by the creation section toward another apparatus through the local network, and the creation section includes a table processing section that creates a new PMT that suits the local network, based on a PMT (Program Map Table) contained in the encrypted stream recorded in the recording section.

In the content receiving device according to the third aspect, the creation section creates a new stream that suits the local network based on the stream decrypted by the second decryption section, and the transmission section transmits the new stream created by the creation section to another apparatus through the local network. For example, in a case where the content receiving device is applied to a home network system structured by apparatuses that comply with DLNA (Digital Living Network Alliance), the creation section creates a partial TS that complies with DLNA, based on the stream decrypted by the second decryption section. Accordingly, the content recorded in the recording section by the content receiving device can be distributed to a content reproducing device in the home network system, or transferred to a content-recording device in the home network system.

Further, the table processing section creates a new PMT that suits the local network, based on the PMT contained in the encrypted stream recorded in the recording section. Accordingly, a CA (Conditional Access) descriptor regarding limited reception can be deleted from, and a DTCP (Digital Transmission Content Protection) descriptor can be inserted into the PMT contained in the encrypted stream recorded in the recording section, whereby a new PMT that complies with DLNA can be created. In addition, the PMT contained in the encrypted stream received by the receiving section (that is, the PMT containing the CA descriptor) is recorded in the recording section. Therefore, by referring to the CA descriptor in the PMT, the second decryption section can extract the key from the encrypted stream recorded in the recording section, and as a result, can perform decryption of the encrypted stream without any problem.

The content receiving device according to a fourth aspect of the present invention which is based on the content receiving device according to the third aspect further includes a selection section that selects, in a case where contents of a plurality of channels are contained in the stream received by the receiving section, a content of one channel from among the contents of the plurality of channels, wherein only the encrypted stream that corresponds to the content of the channel selected by the selection section, among the contents of the plurality of channels, is recorded in the recording section.

In the content receiving device according to the fourth aspect, only the encrypted stream that corresponds to the content of the channel selected by the selection section, among contents of a plurality of channels, are recorded in the recording section. Therefore, by the second decryption section decrypting the encrypted stream recorded in the recording section, a stream complying with DLNA (that is, a stream containing only the content of only one channel) can be obtained. In addition, when compared with a case where a stream containing contents of a plurality of channels is to be recorded in the recording section, recording capacity necessary to record the stream can be reduced.

The content receiving device according to a fifth aspect of the present invention which is based on the content receiving device according to the fourth aspect further includes a table processing section that creates, based on a PAT (Program Association Table) contained in the stream received by the receiving section, a new PAT that corresponds only to the content of the channel selected by the selection section among the contents of the plurality of channels, wherein the new PAT is recorded in the recording section.

In the content receiving device according to the fifth aspect, the table processing section creates a new PAT that corresponds only to the content of the channel selected by the selection section, among the contents of the plurality of channels. The new PAT created by the table processing section is recorded in the recording section. Therefore, when compared with a case where the PAT contained in the stream received by the receiving section (that is, the PAT containing information of contents of channels that were not selected) is recorded in the recording section, recording capacity necessary to record the stream can be reduced.

The content receiving device according to a sixth aspect of the present invention which is based on the content receiving device according to the first aspect further includes an encryption section that encrypts, in a case where the stream received by the receiving section is a non-encrypted stream, the non-encrypted stream by using the unique key of the content receiving device, wherein the stream encrypted by the encryption section is recorded in the recording section.

In the content receiving device according to the sixth aspect, the encryption section encrypts a non-encrypted stream by using the unique key of the content receiving device. Then, the stream encrypted by the encryption section is recorded in the recording section. Therefore, confidentiality of the stream can be secured.

The content receiving device according to a seventh aspect of the present invention which is based on the content receiving device according to the first aspect further includes: a creation section that creates a reference file to be referred to when special reproduction of the content is performed, wherein the first decryption section decrypts, as the specific packet, a predetermined packet containing a predetermined type of picture to be used in the special reproduction of the content, and the obtaining section obtains, as the predetermined information, time information added to the predetermined packet and information indicating a position of the predetermined type of picture in the stream, and regarding the predetermined packet, the creation section creates, based on the time information, elapsed-time information indicating an elapsed time from the beginning of the content, and causes the elapsed-time information and the information indicating the position of the predetermined type of picture in the stream to be included in the reference file.

In the content receiving device according to the seventh aspect, the first decryption section decrypts a predetermined packet containing a predetermined type of picture to be used in the special reproduction of the content, and the obtaining section obtains time information added to the predetermined packet and information indicating the position of the predetermined type of picture in the stream. Then, regarding the predetermined packet, the creation section creates, based on the time information, elapsed-time information indicating an elapsed time from the beginning of the content, and causes the elapsed-time information and the information indicating the position of the predetermined type of picture in the stream to be included in the reference file. Accordingly, it is possible to easily perform the special reproduction of the content, by referring to the reference file created by the creation section. Moreover, the elapsed-time information regarding the predetermined packet is contained in the reference file. Therefore, by using the elapsed-time information, it is possible to easily perform time-search play for reproducing a content by specifying a midstream time of the content. Further, in a case where fast-forward is performed by using a plurality of pictures of a predetermined type, it is possible to use the pictures located at approximately equal time intervals, by using the elapsed-time information. Therefore, it is possible to perform smooth fast-forward.

In the content receiving device according to an eighth aspect of the present invention which is based on the content receiving device according to the seventh aspect, the predetermined packet contains a first predetermined packet to which first time information is added, and a second predetermined packet, which follows the first predetermined packet, and to which second time information is added, and the creation section creates, regarding the first predetermined packet, first elapsed-time information based on the first time information, creates, regarding the second predetermined packet, second elapsed-time information based on the second time information, and creates, when a difference between a value of the first time information and a value of the second time information is greater than or equal to a predetermined threshold due to a packet loss, the first elapsed-time information and the second elapsed-time information that are continuous to each other.

In the content receiving device according to the eighth aspect, when the difference between the value of the first time information and the value of the second time information is greater than or equal to a predetermined threshold due to a packet loss, the creation section creates first elapsed-time information and second elapsed-time information that are continuous to each other. Accordingly, it is possible to avoid a situation where there is a great difference in the elapsed-time information between before and after the position of the occurrence of the packet loss. Therefore, it is possible to perform the special reproduction of the content without any problem.

In the content receiving device according to a ninth aspect of the present invention which is based on the content receiving device according to the seventh aspect, in a case where the stream received by the receiving section is an encrypted stream, the creation section causes information indicating a position of the key in the stream to be included in the reference file.

In the content receiving device according to the ninth aspect, the creation section causes information indicating the position of the key in the stream to be included in the reference file. Accordingly, by referring to the reference file when reproducing the content, it is possible to easily specify the position of the key in the stream.

In the content receiving device according to a tenth aspect of the present invention which is based on the content receiving device according to the seventh aspect, in a case where the stream received by the receiving section contains viewing limitation information for the content, the creation section causes information indicating a position of the viewing limitation information in the stream to be included in the reference file.

In the content receiving device according to the tenth aspect, the creation section causes information indicating the position of viewing limitation information in the stream to be included in the reference file. Accordingly, by referring to the reference file when reproducing the content, it is possible to easily specify the position of the viewing limitation information in the stream.

In the content receiving device according to an eleventh aspect of the present invention which is based on the content receiving device according to the seventh aspect, in a case where the stream received by the receiving section contains duplication limitation information for the content, the creation section causes information indicating a position of the duplication limitation information in the stream to be included in the reference file.

In the content receiving device according to the eleventh aspect, the creation section causes information indicating the position of duplication limitation information in the stream to be included in the reference file. Accordingly, by referring to the reference file when reproducing the content, it is possible to easily specify the duplication limitation information in the stream.

In the content receiving device according to a twelfth aspect of the present invention which is based on the content receiving device according to the seventh aspect, the creation section causes information indicating a position of a PAT (Program Association Table) in the stream to be included in the reference file.

In the content receiving device according to the twelfth aspect, the creation section causes information indicating the position of the PAT in the stream to be included in the reference file. Accordingly, by referring to the reference file when reproducing the content, it is possible to easily specify the position of the PAT in the stream.

In the content receiving device according to a thirteenth aspect of the present invention which is based on the content receiving device according to the first aspect, in a case where a compression method whereby one PES (Packetized Elementary Stream) contains one type of picture is employed as a compression method for the stream, the first decryption section decrypts only a packet located at the beginning among a plurality of packets constituting a PES.

In the content receiving device according to the thirteenth aspect, the first decryption section decrypts only the packet located at the beginning of a plurality of packets constituting a PES. Therefore, when compared with a case where all of the plurality of packets constituting a PES, it is possible to reduce processing loads.

In the content receiving device according to a fourteenth aspect of the present invention which is based on the content receiving device according to the first aspect, in a case where a compression method that allows one PES (Packetized Elementary Stream) to contain a plurality of types of pictures is employed as the compression method for the stream, the first decryption section sequentially performs decryption, starting from a packet located at the beginning of a plurality of packets constituting a PES, and ends the decryption for the PES upon detecting a predetermined end position.

In the content receiving device according to the fourteenth aspect, the first decryption section sequentially performs decryption, starting from a packet located at the beginning of a plurality of packets constituting a PES, and ends the decryption for the PES upon detecting a predetermined end position. Therefore, when compared with a case where all of the plurality of packets constituting a PES are decrypted, it is possible to reduce processing loads.

The content receiving device according to a fifteenth aspect of the present invention which is based on the content receiving device according to the first aspect further includes a detection section that detects a compression method for the stream received by the receiving section; and a control section that controls the decryption performed by the first decryption section, based on a result of the detection performed by the detection section, wherein under control by the control section, the first decryption section decrypts, in a case where a compression method whereby one PES (Packetized Elementary Stream) contains one type of picture is employed as the compression method for the stream, only a packet located at the beginning of a plurality of packets constituting a PES, and sequentially performs decryption, in a case where a compression method that allows one PES to contain a plurality of types of pictures is employed as the compression method for the stream, starting from a packet located at the beginning of a plurality of packets constituting a PES, and ends the decryption for the PES upon detecting a predetermined end position.

In the content receiving device according to the fifteenth aspect, in a case where a compression method whereby one PES contains one type of picture is employed as the compression method for the stream, the first decryption section decrypts only the packet located at the beginning of a plurality of packets constituting a PES. Further, in a case where a compression method that allows one PES to contain a plurality of types of pictures is employed as the compression method for the stream, the first decryption section sequentially performs decryption, starting from a packet located at the beginning of a plurality of packets constituting a PES, and ends the decryption for the PES upon detecting a predetermined end position. Therefore, in either type of decryption, it is possible to reduce processing loads when compared with a case where all of the plurality of packets constituting a PES are decrypted. Moreover, by switching the manner of the decryption performed by the decryption section in accordance with the compression method for the stream, it is possible to perform optimum decryption in accordance with the received stream.

A content receiving device according to a sixteenth aspect of the present invention is directed to a content receiving device, including: a receiving section that receives a stream in which data of a content containing video is divided into a plurality of packets; a decryption section that decrypts, among the plurality of packets, a predetermined packet containing a predetermined type of picture to be used in special reproduction of the content; an obtaining section that obtains, based on data decrypted by the decryption section, time information added to the predetermined packet and information indicating a position of the predetermined type of picture in the stream; and a creation section that creates a reference file to be referred to when special reproduction of the content is performed, wherein regarding the predetermined packet, the creation section creates, based on the time information, elapsed-time information indicating an elapsed time from the beginning of the content, and causes the elapsed-time information and the information indicating the position of the predetermined type of picture in the stream to be included in the reference file.

In the content receiving device according to the sixteenth aspect, the decryption section decrypts a predetermined packet containing a predetermined type of picture to be used in special reproduction of the content, and the obtaining section obtains time information added to the predetermined packet and information indicating the position of the predetermined type of picture in the stream. Then, regarding the predetermined packet, the creation section creates elapsed-time information indicating an elapsed time from the beginning of the content based on the time information, and causes the elapsed-time information and the information indicating the position of the predetermined type of picture in the stream to be included in the reference file. Therefore, by referring to the reference file created by the creation section, it is possible to easily perform special reproduction of the content. Further, the elapsed-time information regarding the predetermined packet is included in the reference file. Therefore, by using the elapsed-time information, it is possible to easily perform time-search play for reproducing the content by specifying a midstream time of the content. Moreover, when fast-forward is performed by using a plurality of pictures of a predetermined type, it is possible to use the pictures located at approximately equal time intervals, by using the elapsed-time information. Therefore, it is possible to perform smooth fast-forward.

A content reproducing device according to a seventeenth aspect of the present invention is directed to a content reproducing device including: a reproduction section that reproduces, based on a stream of data of a content containing video, the stream read from a recording section in which a predetermined reference file and the stream are recorded, wherein the reference file contains elapsed-time information indicating an elapsed time from the beginning of the content and information indicating a position of a predetermined type of picture in the stream, and the reproduction section performs special reproduction of the content by use of the predetermined type of picture, by referring to the reference file.

In the content reproducing device according to the seventeenth aspect, the reference file contains elapsed-time information indicating an elapsed time from the beginning of the content and information indicating the position of a predetermined type of picture in the stream. The reproduction section performs special reproduction of the content by use of the predetermined type of picture, by referring to the reference file. Accordingly, by using the elapsed-time information contained in the reference file, the reproduction section can easily perform time-search play for reproducing the content by specifying a midstream time of the content. Further, when performing fast-forward by using a plurality of pictures of a predetermined type, the reproduction section can use the pictures located at approximately equal time intervals, by using the elapsed-time information, and thus, can perform smooth fast-forward.

In the content reproducing device according to an eighteenth aspect of the present invention which is based on the content reproducing device according to the seventeenth aspect, the reproduction section performs, based on the elapsed-time information, the special reproduction of the content by using a plurality of the predetermined type of pictures located at approximately equal time intervals.

In the content reproducing device according to the eighteenth aspect, the reproduction section performs, based on the elapsed-time information, special reproduction of the content by using a plurality of the predetermined type pictures located at approximately equal time intervals. By using the pictures located at approximately equal time intervals, it is possible to perform smooth fast-forward.

A content receiving and reproducing device according to a nineteenth aspect of the present invention includes the content receiving device according to claim 1; and the content reproducing device according to claim 17.

With the content receiving and reproducing device according to the nineteenth aspect, it is possible to reduce processing loads when an encrypted stream is decrypted, and it is possible to obtain a recording and reproducing device that can easily perform special reproduction of the content.

A content receiving method according to a twentieth aspect of the present invention is directed to a content receiving method including the steps of: (A) receiving a stream in which a content containing video is divided into a plurality of packets; (B) extracting, in a case where the stream received in the step (A) is an encrypted stream, a key for decrypting the encrypted stream from the stream; (C) decrypting, by using the key, only a specific packet among the plurality of packets; and (D) obtaining predetermined information of the stream, based on data decrypted in the step (C).

In the content receiving method according to the twentieth aspect, in step (C), only a specific packet among a plurality of packets constituting an encrypted stream is decrypted, and in step (D), predetermined information of the stream is obtained based on data decrypted in step (C). Therefore, when compared with a case where the entire encrypted stream is decrypted in order to obtain the predetermined information of the stream, it is possible to reduce processing loads when the encrypted stream is decrypted.

A program according to a twenty-first aspect of the present invention is a program for causing a computer included in a content receiving device to function as: receiving means for receiving a stream in which data of a content containing video is divided into a plurality of packets; extraction means for extracting, in a case where the stream received by the receiving means is an encrypted stream, a key for decrypting the encrypted stream from the stream; decryption means for decrypting, by using the key, only a specific packet among the plurality of packets; and obtaining means for obtaining predetermined information of the stream, based on data decrypted by the decryption means.

With the program according to the twenty-first aspect, the decryption means decrypts only a specific packet among a plurality of packets constituting an encrypted stream, and the obtaining means obtains predetermined information of the stream based on data decrypted by the decryption means. Therefore, when compared with a case where the entire encrypted stream is decrypted in order to obtain the predetermined information of the stream, it is possible to reduce processing loads when the encrypted stream is decrypted.

Advantageous Effects of the Invention

According to the present invention, it is possible to obtain a content receiving device, a content reproducing device, a content receiving and reproducing device, a content receiving method, and a program, which can reduce processing loads when an encrypted stream is decrypted.

BRIEF DESCRIPTION OF THE DRAWINGS

FIG. 6 shows a part of a reference file created by a creation section.

DESCRIPTION OF EMBODIMENTS

Figure 1:
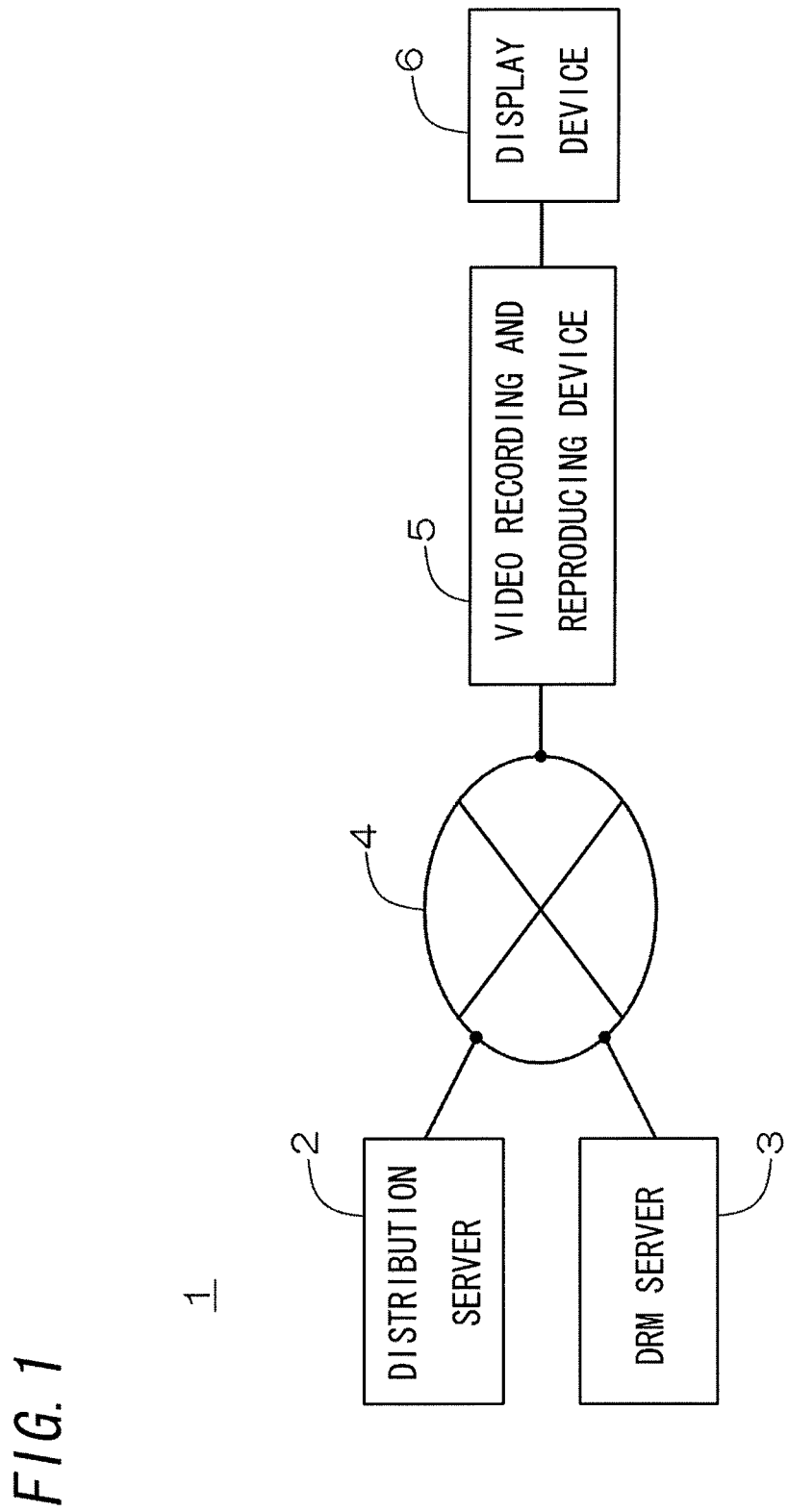
FIG. 1 shows an overall configuration of a video distribution system according to an embodiment of the present invention.

Hereinafter, an embodiment of the present invention will be described in detail with reference to the drawings. Note that elements denoted by the same reference characters in different drawings refer to the same or their corresponding elements.

FIG. 1 shows an overall configuration of a video distribution system 1 according to an embodiment of the present invention. As shown in FIG. 1, the video distribution system 1 includes a distribution server 2 which distributes a video stream of a content containing video, a DRM (Digital Rights Management) server 3 which performs processing such as encryption onto a video stream, a communication network 4 such as an IP network, a video recording and reproducing device 5 (content receiving and reproducing device) such as an STB (Set Top Box) which receives a video stream and records and reproduces the video stream, and a display device 6 which displays a content based on the reproduced video stream.

Figure 2:
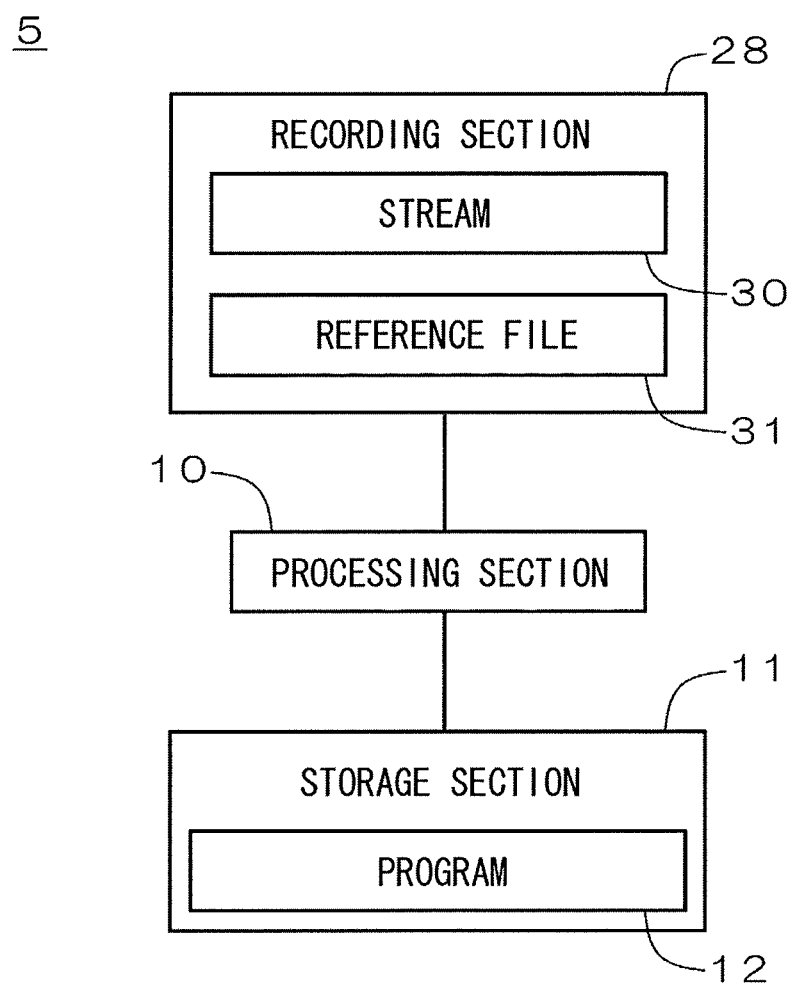
FIG. 2 shows a configuration of a computer mounted in a video recording and reproducing device.

FIG. 2 shows a configuration of a computer mounted in the video recording and reproducing device 5. As shown in FIG. 2, the computer includes a processing section 10 such as a CPU, a storage section 11 such as a semiconductor memory, and a recording section 28 having a recording medium such as a hard disk. A predetermined program 12 is stored in the storage section 11. A video stream 30 and a reference file 31 are recorded in the recording section 28 (described in detail later). The processing section 10 is connected to the storage section 11 and the like via buses, and reads the program 12 from the storage section 11 to execute it. Note that the recording section 28 may be included in the video recording and reproducing device 5, or may be externally connected to the video recording and reproducing device 5 via an interface such as a USB.

Figure 3:
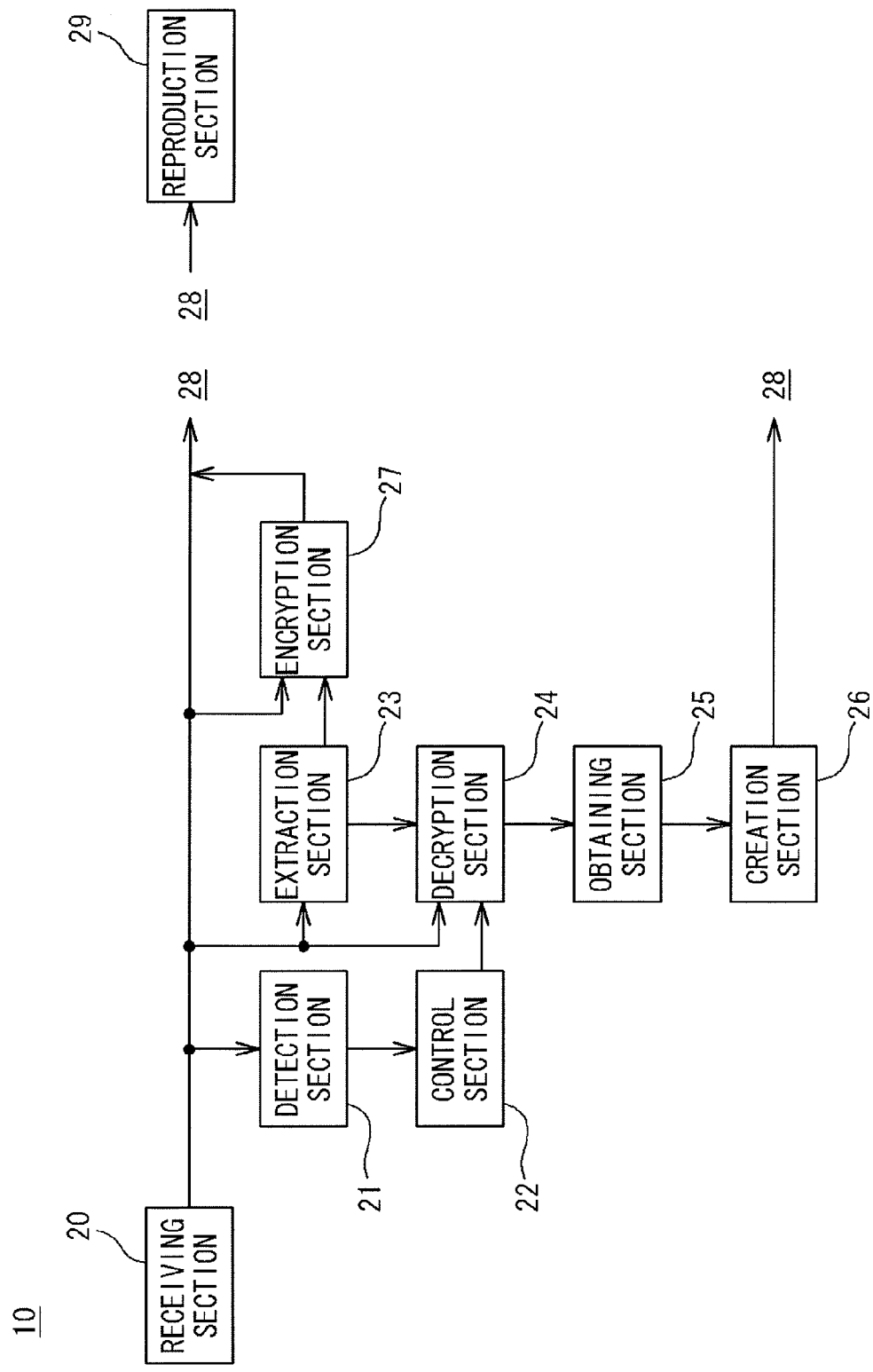
FIG. 3 is a block diagram showing functions realized by a processing section executing a program.

FIG. 3 is a block diagram showing functions realized by the processing section 10 executing the program 12. As shown in FIG. 3, the processing section 10 includes a receiving section 20, a detection section 21, a control section 22, an extraction section 23, a decryption section 24, an obtaining section 25, a creation section 26, an encryption section 27, and a reproduction section 29. In other words, the program 12 is a program that causes the computer mounted in the video recording and reproducing device 5 to function as the receiving section 20, the detection section 21, the control section 22, the extraction section 23, the decryption section 24, the obtaining section 25, the creation section 26, the encryption section 27, and the reproduction section 29.

The receiving section 20 receives a video stream distributed from the distribution server 2 through the communication network 4. The video stream is a stream compressed by a compression method such as MPEG-2 or H.264, and has a configuration in which data of a content including video, audio, various types of PSI (Program Specific Information), SI (Service Information), and the like is divided into a plurality of TS (Transport Stream) packets.

When the receiving section 20 is receiving a video stream encrypted by the DRM server 3 (hereinafter referred to as "encrypted stream"), the extraction section 23 extracts a scramble key for decrypting the encrypted stream, from the video stream. Specifically, the extraction section 23 extracts an ECM (Entitlement Control Message) from the video stream, decrypts the encryption of the ECM by an EMM (Entitlement Management Message) work key, and then, obtains the scramble key included in the ECM.

The decryption section 24 decrypts the encrypted stream using the scramble key extracted by the extraction section 23. At that time, the decryption section 24 does not decrypt all of the TS packets that constitute the encrypted stream, but decrypts only specific TS packets.

Figure 4:
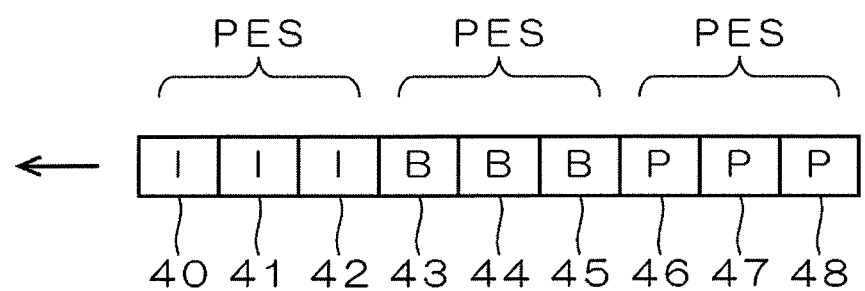
FIG. 4 is a simplified diagram of an example of an MPEG-2 video stream.

FIG. 4 is a simplified diagram of an example of an MPEG-2 video stream. In MPEG-2, one PES (Packetized Elementary Stream) contains only one type of picture. In the example shown in FIG. 4, three TS packets 40 to 42 constituting an I-picture PES, three TS packets 43 to 45 constituting a B-picture PES, and three TS packets 46 to 48 constituting a P-picture PES, are arranged in this order. The decryption section 24 decrypts TS packets, among these TS packets 40 to 48, whose start indicators contained in their TS headers are "1", that is, the TS packets 40, 43, and 46 which are located at the beginning of the respective PESs. By decrypting these TS packets and referring to the picture headers contained in the TS packets, the types of the pictures contained in the TS packets can be confirmed, respectively. Note that the remaining TS packets 41 and 42 each containing an I-picture may be decrypted.

Figure 5:
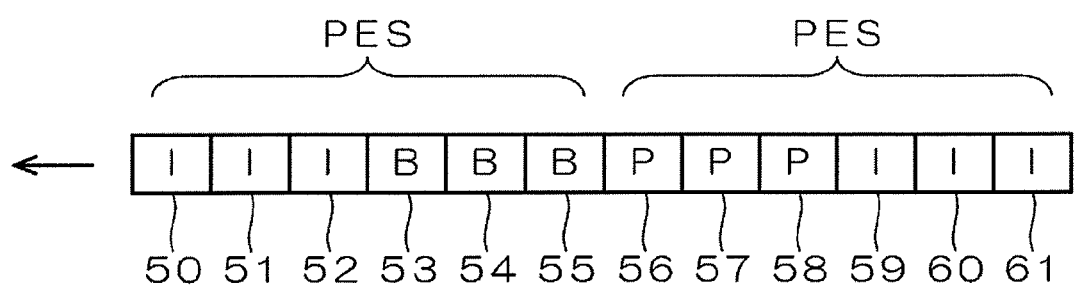
FIG. 5 is a simplified diagram of an example of an H.264 video stream.

FIG. 5 is a simplified diagram of an example of an H.264 video stream. In H.264, one PES may contain two types of pictures in a top field and a bottom field, respectively. In the example shown in FIG. 5, six TS packets 50 to 55 constituting a PES whose top field is composed of I-pictures and whose bottom field is composed of B-pictures, and six TS packets 56 to 61 constituting a PES whose top field is composed of P-pictures and whose bottom field is composed of I-pictures are arranged in this order. The decryption section 24 sequentially performs decryption, starting from a packet at the beginning of the plurality of packets constituting a PES (that is, a TS packet whose start indicator is "1"), and upon detecting a predetermined end position (access unit start code) indicating a packet at the beginning of the bottom field, the decryption section 24 ends the decryption of the PES. In the example shown in FIG. 5, the decryption section 24 decrypts the TS packets 50 to 53, and 56 to 59. Note that the remaining TS packets 60 and 61, which each contain an I-picture, may be decrypted.

With reference to FIG. 3, based on the result of the decryption process performed by the decryption section 24, the obtaining section 25 obtains time stamp values (4-byte length counter values which each indicate time information) added to the TS packets containing I-pictures, respectively, and information that indicates positions (beginning position and end position) of I-pictures in the video stream. Moreover, by specifying TS packets containing a PAT (Program Association Table), a PMT (Program Map Table), and an ECM, respectively, with reference to the TS header of each TS packet, the obtaining section 25 obtains information that indicates positions of the PAT, PMT, and ECM in the video stream. The PAT contains a PID (Packet Identifier) of the PMT. The PMT contains content viewing limitation information (such as age requirements), and content duplication limitation information (such as copy guard information) in the case of a non-encrypted stream. The ECM contains the above-described scramble key, and content duplication limitation information in the case of an encrypted stream.

Based on these pieces of information obtained by the obtaining section 25, the creation section 26 creates a reference file 31 and records it in the recording section 28. FIG. 6 shows a part of the reference file 31 created by the creation section 26. The reference file 31 contains PAT information indicating a position of the PAT in the video stream, PMT information indicating a position of the PMT in the video stream, ECM information indicating a position of the ECM in the video stream, I-picture information indicating a position of an I-picture in the video stream, and elapsed-time information indicating an elapsed time from the beginning of the content (record starting time).

In the PAT information, a tag indicating that the information is the PAT information, a file number of the content file, an offset value from the beginning of the content file, and the size of the PAT are described. Similarly, in the PMT information, a tag indicating that the information is the PMT information, a file number of the content file, an offset value from the beginning of the content file, and the size of the PMT are described. Similarly, in the ECM information, a tag indicating that the information is the ECM information, a file number of the content file, an offset value from the beginning of the content file, and the size of the ECM are described. Similarly, in the I-picture information, a tag indicating that the information is the I-picture information, a file number of the content file, an offset value from the beginning of the content file, and the size of the I-picture are described. Similarly, in the elapsed-time information, a tag indicating that the information is the elapsed-time information, a file number of the content file, an offset value from the beginning of the content file, and an elapsed time from the start of the recording are described.

The PAT information, the PMT information, and the ECM information are created each time a PAT, a PMT, and an ECM appear in the video stream, and then included in the reference file 31. The I-picture information is created each time a TS packet containing an I-picture is detected by the decryption section 24, and then included in the reference file 31. The elapsed-time information is created at a predetermined time interval (for example, an interval of 1 second or 100 millisecond), and then included in the reference file 31.

Figure 7:
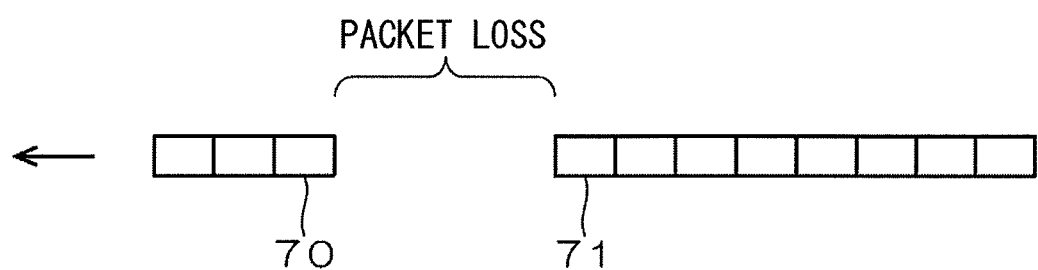
FIG. 7 shows a state where a packet loss has occurred in a part of a video stream.

Here, the creation section 26 creates elapsed-time information based on the above time stamp values obtained by the obtaining section 25. FIG. 7 shows a state where a packet loss has occurred in a part of the video stream. In this case, a time stamp value added to a TS packet 70 immediately before the packet loss has occurred and a time stamp value added to a TS packet 71 immediately after the packet loss has resolved are greatly different from each other. Accordingly, pieces of elapsed-time information created based on these time stamp values are not continuous with each other. Therefore, when the difference between the time stamp value of the TS packet 70 and the time stamp value of the TS packet 71 is greater than or equal to a predetermined threshold, the creation section 26 causes the elapsed time for the TS packet 71 to be continuous to the elapsed time for the TS packet 70, thereby handling them as if no packet loss had occurred.

With reference to FIG. 3, the encryption section 27 re-encrypts the scramble key extracted by the extraction section 23, by using a local work key unique to the video recording and reproducing device 5. Then, the encryption section 27 writes the re-encrypted scramble key in its original position in the video stream. In this case, the video stream 30 containing the scramble key re-encrypted by the encryption section 27 is recorded in the recording section 28. Further, in a case where the video stream received by the receiving section 20 is a non-encrypted stream, the encryption section 27 encrypts the video stream by the local work key. In this case, the video stream 30 encrypted by the encryption section 27 is recorded in the recording section 28.

The detection section 21 detects a compression method employed for the video stream received by the receiving section 20. In the case of this example, the detection section 21 detects whether the compression method is MPEG-2 or H.264.

Based on the result of the detection by the detection section 21, the control section 22 controls the decryption section 24 such that the decryption section 24 performs the decryption process described with reference to FIG. 4 in a case where the compression method is MPEG-2, and such that the decryption section 24 performs the decryption process described with reference to FIG. 5 in a case where the compression method is H.264.

Based on the video stream 30 read from the recording section 28, the reproduction section 29 reproduces the content. Moreover, the reproduction section 29 can perform special reproduction (also referred to as "trick play") such as fast-forward, time-search play, and the like, by referring to the reference file 31 recorded in the recording section 28. When fast-forward is to be performed, the positions of I-pictures contained in the video stream 30 can be specified by referring to I-picture information contained in the reference file 31. At that time, by referring to elapsed-time information contained in the reference file 31, fast-forward can be performed by using a plurality of I-pictures having equal time intervals (including approximately equal time intervals) between each other. When time-search play is to be performed, an elapsed time from the beginning of the content can be determined by referring to elapsed-time information contained in the reference file 31.

<Modification>

Figure 8:
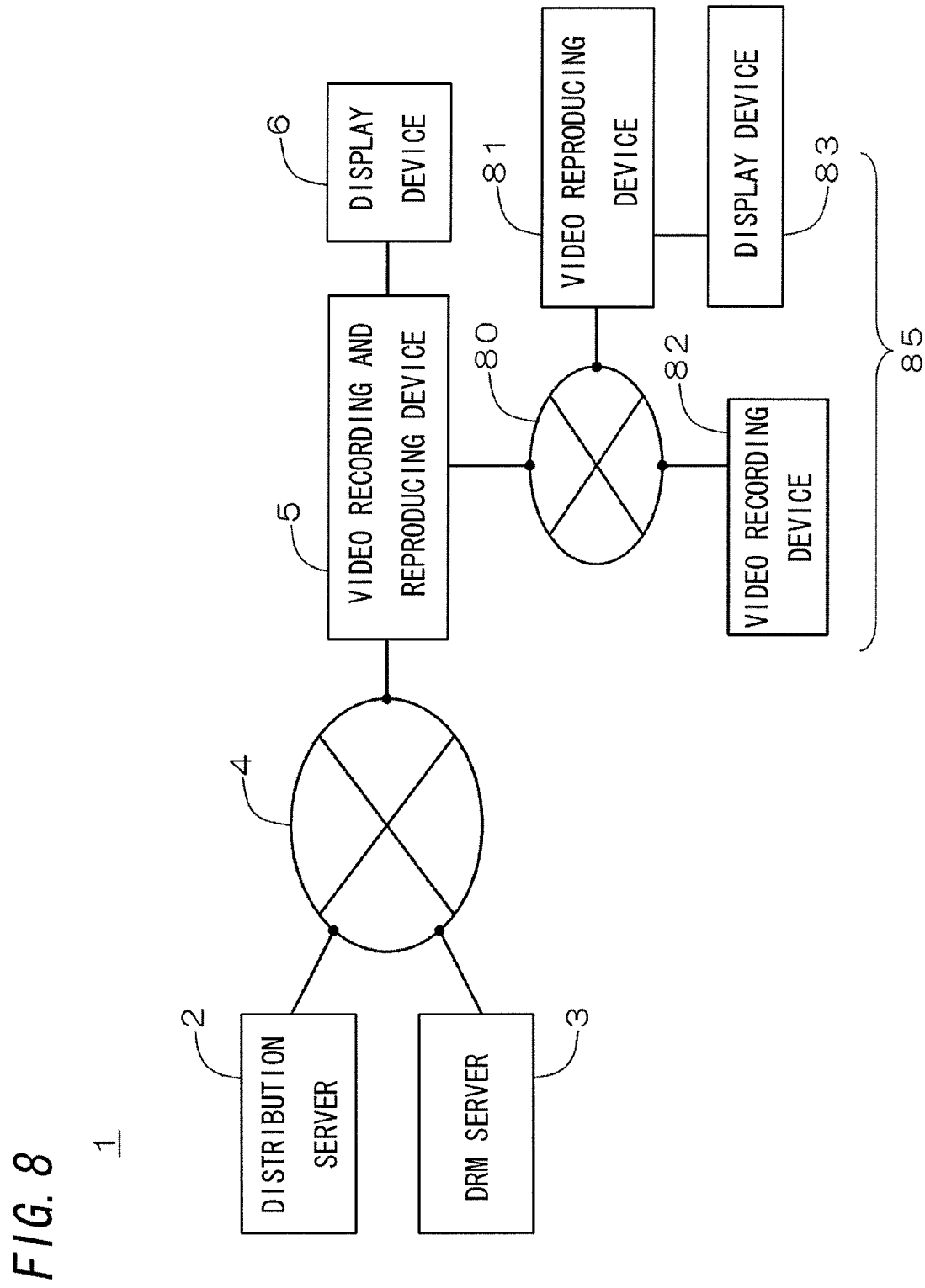
FIG. 8 shows an overall configuration of a video distribution system according to a modification.

FIG. 8 shows an overall configuration of the video distribution system 1 according to a modification. A home network system 85 using a local network 80 such as an in-house LAN (Local Area Network) is built in the house of a user. The home network system 85 includes the video recording and reproducing device 5, a video reproducing device 81, and a video recording device 82 which are connected to each other through the local network 80. The video recording device 82 is, for example, a hard disk recorder or a Blu-ray recorder. A display device 83 is connected to the video reproducing device 81. The video recording and reproducing device 5, the video reproducing device 81, and the video recording device 82 are apparatuses that comply with DLNA (Digital Living Network Alliance). DLNA has established guidelines regarding connection between apparatuses, based on UPnP (Universal Plug and Play) which is a technical specification that facilitates connection of apparatuses, content sharing, and the like. The video recording and reproducing device 5 can distribute a content recorded in the recording section 28 to the video reproducing device 81, or transfer the content to the video recording device 82.

Figure 9:
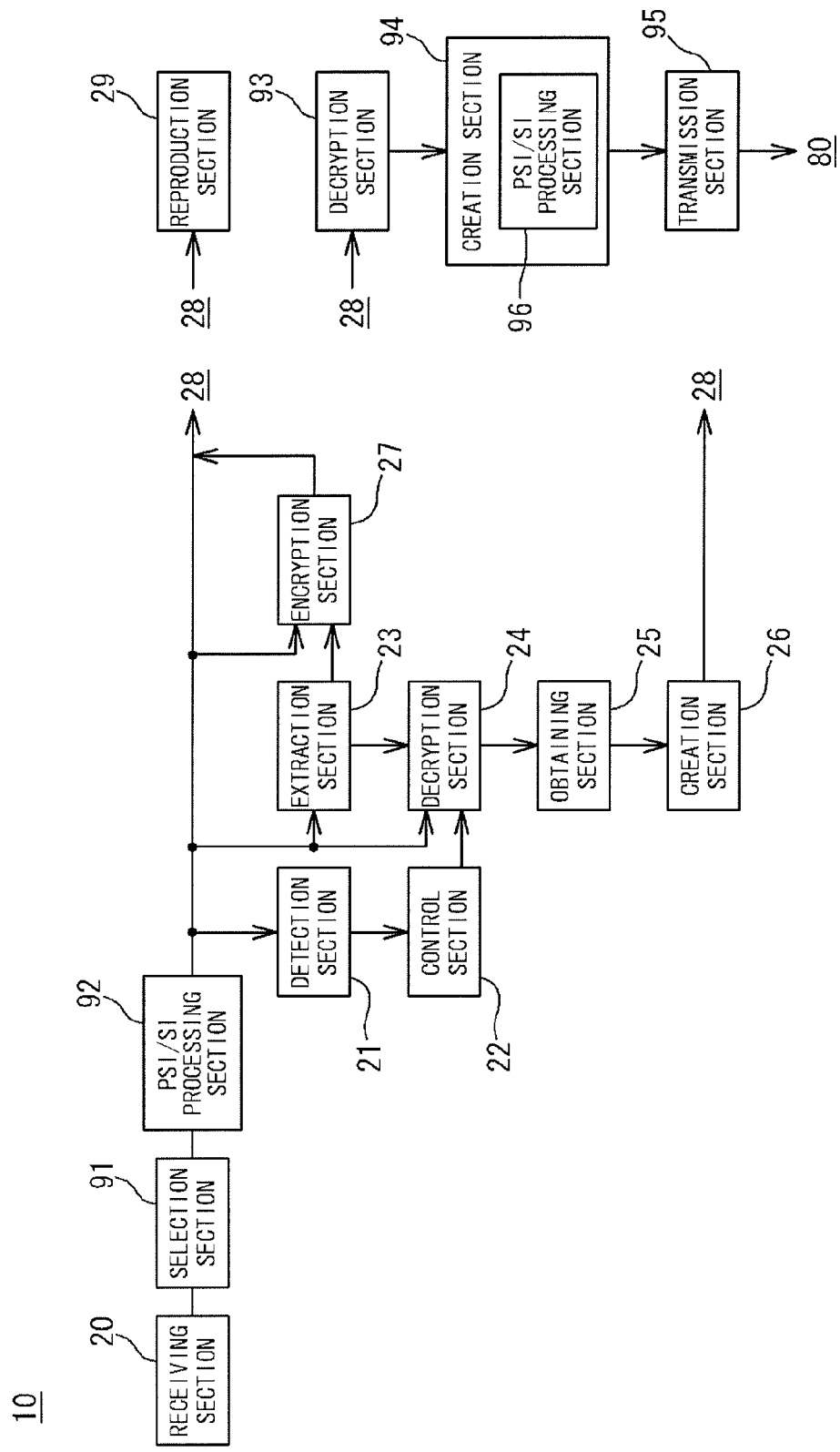
FIG. 9 is a block diagram showing functions realized by a processing section executing a program for a video recording and reproducing device according to a modification.

FIG. 9 is a block diagram showing functions realized by the processing section 10 executing the program 12 for the video recording and reproducing device 5 according to the modification. As shown in FIG. 9, the processing section 10 includes, a selection section 91, a PSI/SI processing section 92, a decryption section 93, a creation section 94, and a transmission section 95, in addition to the components shown in FIG. 3. The creation section 94 includes a PSI/SI processing section 96.

When the receiving section 20 is receiving a multi program transport stream, the selection section 91 selects and outputs a content of one channel specified by the user from among contents of a plurality of channels contained in the video stream. Content data (such as video data and audio data) of each of the plurality of channels is contained in a multi program transport stream. By the selection section 91 selecting a channel, only the content data of the channel specified by the user among the plurality of channels is recorded in the recording section 28.

Moreover, when the receiving section 20 is receiving a multi program transport stream, PMTs and ECMs of the respective plurality of channels are contained in the video stream. The PSI/SI processing section 92 selects and outputs a PMT and an ECM corresponding to the channel specified by the user. Accordingly, only the PMT and the ECM corresponding to the channel specified by the user are recorded in the recording section 28. Note that the PMT recorded in the recording section 28 contains a CA (Conditional Access) descriptor. The CA descriptor describes the position of the ECM in the video stream recorded in the recording section 28 (that is, the position of a scramble key re-encrypted by the local work key).

Moreover, PIDs of PMTs of the respective plurality of channels are described in a PAT contained in the video stream received by the receiving section 20. The PSI/SI processing section 92 corrects the PAT such that only the PID of the PMT corresponding to the channel specified by the user among the PIDs of the PMTs of the respective plurality of channels is described, and outputs the corrected PAT. Accordingly, a new PAT created by the correction is recorded in the recording section 28. Note that the creation of a new PAT is not necessarily performed by the PSI/SI processing section 92, and may be performed by the PSI/SI processing section 96 included in the creation section 94.

The decryption section 93 extracts the ECM from the video stream recorded in the recording section 28, by referring to the CA descriptor in the PMT recorded in the recording section 28. Then, the decryption section 93 extracts the scramble key re-encrypted by the local work key, from the ECM. Then, the decryption section 93 decrypts the scramble key by the local work key, that is, decrypts the encryption of the scramble key. Then, the decryption section 93 decrypts the video stream by the scramble key, that is, decrypts the encryption of the video stream.

Based on the video stream inputted from the decryption section 93, the creation section 94 creates a new video stream (partial TS) that complies with DLNA. Specifically, by deleting the CA descriptor from and inserting a DTCP (Digital Transmission Content Protection) descriptor to the PMT in the video stream inputted from the decryption section 93, the PSI/SI processing section 96 creates a new PMT. Moreover, based on predetermined PSI and SI in the video stream inputted from the decryption section 93, the PSI/SI processing section 96 creates a SIT (Selection Information Table) and a DIT (Discontinuity Information Table) that is permitted to transfer in a partial TS. As a result, the partial TS created by the creation section 94 contains content data of the channel selected by the selection section 91, the PAT created by the PSI/SI processing section 92 (that is, the PAT describing only the PID of the PMT corresponding to the selected channel), the PMT created by the PSI/SI processing section 96 (that is, the PMT from which the CA descriptor has been deleted and the DTCP descriptor has been inserted), and the SIT and the DIT created by the PSI/SI processing section 96. As a result, a stream conforming to the DLNA is obtained.

The transmission section 95 transmits the partial TS created by the creation section 94 toward the video reproducing device 81 or the video recording device 82 through the local network 80.

SUMMARY

As described above, in the video recording and reproducing device 5 according to the present embodiment, the decryption section 24 (first decryption section) decrypts only specific packets among a plurality of TS packets constituting an encrypted stream, and the obtaining section 25 obtains predetermined information of the video stream, based on data decrypted by the decryption section 24. Accordingly, it is possible to reduce processing loads at a time when an encrypted stream is decrypted, compared with a case where the entire encrypted stream is decrypted in order to obtain the predetermined information of the video stream.

Further, the encryption section 27 encrypts, by using a local work key, a scramble key extracted by the extraction section 23. Then, the video stream containing the scramble key encrypted by the encryption section 27 is recorded in the recording section 28. Accordingly, since the scramble key which was once decrypted when being extracted from the video stream is encrypted again by use of the local work key, the confidentiality of the scramble key can be secured. Further, the encrypted stream received by the receiving section 20 is recorded in the recording section 28. Accordingly, it is possible to reduce the processing loads, compared with a case where an encrypted stream is once decrypted and then encrypted again by used of a local work key, and then is recorded Moreover, in a case where the video stream received by the receiving section 20 is a non-encrypted stream, the encryption section 27 encrypts the non-encrypted stream by using the local work key. Then, the video stream encrypted by the encryption section 27 is recorded in the recording section 28. Accordingly, the confidentiality of the video stream can be secured.

Moreover, the decryption section 24 decrypts TS packets that respectively contain I-pictures to be used in special reproduction of a content (hereinafter referred to as "I-picture containing packets"), and the obtaining section 25 obtains time stamp values added to the I-picture containing packets, and information that indicates the positions of the I-pictures in the video stream. Then, with respect to the I-picture containing packets, based on the time stamp values, the creation section 26 creates pieces of elapsed-time information each indicating an elapsed time from the beginning of the content, and causes the pieces of elapsed-time information and pieces of I-picture information indicating the positions of the I-pictures in the video stream, to be included in the reference file 31. Accordingly, by referring to the reference file 31 created by the creation section 26, special reproduction of the content can be easily performed. Further, since the pieces of elapsed-time information regarding the I-picture containing packets are included in the reference file 31, it is possible, by using the pieces of elapsed-time information, to easily perform time-search play for reproducing a content by specifying a midstream time of the content. Further, in a case where fast-forward is performed by using a plurality of I-pictures, it is possible to use I-pictures located at approximately equal time intervals, by using the elapsed-time information. Therefore, it is possible to perform smooth fast-forward.

Moreover, as shown in FIG. 7, when the difference between the time stamp value of the TS packet 70 and the time stamp value of the TS packet 71 is greater than or equal to a predetermined threshold due to a packet loss, the creation section 26 causes the elapsed-time information regarding the TS packet 70 to be continuous to the elapsed-time information regarding the TS packet 71. Accordingly, it is possible to avoid a situation where there is a great difference in the elapsed-time information between before and after the position of the occurrence of the packet loss. Therefore, it is possible to perform special reproduction of the content without any problem.

Moreover, the creation section 26 causes the ECM information indicating the position of the scramble key in the video stream to be included in the reference file 31. Accordingly, it is possible to easily specify the position of the scramble key in the video stream by referring to the reference file 31 when reproducing the content.

Moreover, the creation section 26 causes the PMT information indicating the position of the viewing limitation information in the video stream to be included in the reference file 31. Accordingly, it is possible to easily specify the position of the viewing limitation information in the video stream, by referring to the reference file 31 when reproducing the content.

Moreover, the creation section 26 causes the PMT information (or the ECM information) indicating the position of the duplication limitation information in the video stream to be included in the reference file 31. Accordingly, it is possible to easily specify the position of the duplication limitation information in the video stream, by referring to the reference file 31 when reproducing the content.

Moreover, the creation section 26 causes the PAT information indicating the position of the PAT in the video stream to be included in the reference file 31. Accordingly, it is possible to easily specify the position of the PAT in the video stream, by referring to the reference file 31 when reproducing the content. As a result, when a lack of some data has occurred in the video stream, it is possible to determine whether the cause is due to a packet loss or the distribution server 2 having stopped transmission, by checking whether the content of the PAT has been changed.

Moreover, in the example shown in FIG. 4, the decryption section 24 decrypts only a TS packet at the beginning of the plurality of TS packets constituting each PES. Accordingly, when compared with a case where all of the plurality of TS packets constituting each PES are decrypted, it is possible to reduce processing loads.

Moreover, in the example shown in FIG. 5, the decryption section 24 sequentially performs decryption, starting from a TS packet at the beginning of the plurality of TS packets that constitute a PES, and ends the decryption for the PES upon detecting a predetermined end position. Accordingly, when compared with a case where all of the plurality of TS packets constituting a PES are decrypted, it is possible to reduce processing loads.

Moreover, by switching, under the control by the control section 22, the manner of the decryption performed by the decryption section 24 in accordance with the compression method of the video stream, it is possible to perform optimum decryption in accordance with the received video stream.

Moreover, by the reproduction section 29 referring to the reference file 31 created by the creation section 26, special reproduction of the content can be easily performed. Further, pieces of elapsed-time information regarding I-picture containing packets are contained in the reference file 31. Accordingly, by using the pieces of elapsed-time information, it is possible to easily perform time-search play for reproducing a content by specifying a midstream time. Further, when fast-forward is performed by using a plurality of I-pictures, it is possible to use I-pictures positioned at approximately equal time intervals, by using pieces of elapsed-time information. Accordingly, smooth fast-forward can be performed.

Moreover, pieces of elapsed-time information each indicating an elapsed time from the beginning of the content, and pieces of I-picture information indicating the positions of the I-pictures in the stream are contained in the reference file 31. The reproduction section 29 performs special reproduction of the content by referring to the reference file 31. Therefore, by using the pieces of elapsed-time information included in the reference file 31, the reproduction section 29 can easily perform time-search play. Moreover, when performing fast-forward by using a plurality of I-pictures, the reproduction section 29 can use I-pictures located at approximately equal time intervals by using pieces of elapsed-time information, and thus, can perform smooth fast-forward.

Moreover, according to the modification shown in FIG. 9, the creation section 94 creates a new video stream that suits the local network 80, based on the video stream decrypted by the decryption section 93 (second decryption section), and the transmission section 95 transmits the new video stream created by the creation section 94 toward another apparatus through the local network 80. For example, as described above, in a case where the video recording and reproducing device 5 is applied to the home network system 85 structured by apparatuses that comply with DLNA, the creation section 94 creates a partial TS that complies with DLNA, based on the video stream decrypted by the decryption section 93. Accordingly, the content recorded in the recording section 28 can be distributed to the video reproducing device 81 in the home network system 85 or can be transferred to the video recording device 82 in the home network system 85.

Moreover, the PSI/SI processing section 96 (table processing section) creates a new PMT that suits the local network 80, based on a PMT contained in the video stream recorded in the recording section 28. Accordingly, by deleting a CA descriptor from and inserting a DTCP descriptor to the PMT contained in the video stream recorded in the recording section 28, a new PMT that complies with DLNA can be created. In addition, the PMT contained in the video stream received by the receiving section 20 (that is, the PMT containing the CA descriptor) is recorded in the recording section 28. Accordingly, the decryption section 93 can extract a scramble key from the video stream recorded in the recording section 28 by referring to the CA descriptor in the PMT, and as a result, can decrypt the video stream without any problem.

Moreover, according to the modification shown in FIG. 9, among contents of a plurality of channels, only the video stream corresponding to the content of the channel selected by the selection section 91 is recorded in the recording section 28. Accordingly, by the decryption section 93 decrypting the video stream recorded in the recording section 28, a stream complying with the DLNA (that is, a stream containing only the content of one channel) can be obtained. In addition, when compared with a case where a video stream containing contents of a plurality of channels are recorded in the recording section 28, recording capacity necessary to record the video stream can be reduced.

Moreover, according to the modification shown in FIG. 9, the PSI/SI processing section 92 (table processing section) creates a new PAT that corresponds to only the content of a channel selected by the selection section 91, among the contents of the plurality of channels. The new PAT created by the PSI/SI processing section 92 is recorded in the recording section 28. Accordingly, when compared with a case where the PAT contained in the video stream received by the receiving section 20 (that is, the PAT containing information of contents of channels that were not selected) are recorded in the recording section 28, the recording capacity necessary to record the video stream can be reduced.

Note that, in the above, a video recording and reproducing device (content receiving and reproducing device) having both of a video stream recording function and a video stream reproducing function has been described. However, the present invention can be applied to a video recording device (content receiving device) that has a recording function but does not have a reproducing function, and to a video reproducing device (content reproducing device) that has a reproducing function but does not have a recording function. Moreover, in the description above, only the I-pictures are used for performing special reproduction. However, the present invention is not limited to this example. For example, the P-pictures may be used in addition to the I-pictures, and further, information necessary for special reproduction may be used in accordance with the video or the content.

Note that the embodiments disclosed are to be considered in all respects as illustrative and not restrictive. The scope of the invention is indicated by the appended claims rather than by the foregoing meaning, and all changes which come within the meaning and range of equivalency of the claims are therefore intended to be embraced therein.

DESCRIPTION OF THE REFERENCE CHARACTERS 5 video recording and reproducing device
12 program
20 receiving section
21 detection section
22 control section
23 extraction section
24 decryption section
25 obtaining section
26 creation section
27 encryption section
28 recording section
29 reproduction section
30 video stream
31 reference file
91 selection section
92, 96 PSI/SI processing section
93 decryption section
94 creation section
95 transmission section

The invention claimed is:

1. A content receiving device that is connected to a predetermined local network, the content receiving device comprising:
a receiver that receives a stream in which data of a content containing video is divided into a plurality of packets;
an extractor that extracts, in a case where the stream received by the receiver is an encrypted stream, a key for decrypting the encrypted stream from the stream;
a first decryptor that decrypts, by using the key, only a specific packet among the plurality of packets;
an encryptor that encrypts the key extracted by the extractor, by using a unique key of the content receiving device, the encrypted stream that includes the key encrypted by the encryptor is recorded in a recording section;
a second decryptor that decrypts, by using the key, the encrypted stream recorded in the recording section;
a processor that creates a new stream that is suitable for the local network, based on the stream decrypted by the second decryptor, the processor having a table processor that creates a new PMT (Program Map Table) that is suitable for the local network, based on a PMT included in the encrypted stream recorded in the recording section; and
a transmitter that transmits the new stream created by the processor towards another apparatus through the local network.

2. The content receiving device according to claim 1, further comprising:
a selector that selects, in a case where contents of a plurality of channels are contained in the stream received by the receiver, a content of one channel from among the contents of the plurality of channels, wherein
only the encrypted stream that corresponds to the content of the channel selected by the selector, among the contents of the plurality of channels, is recorded in the recording section.

3. The content receiving device according to claim 2, further comprising:
a table processor that creates, based on a PAT (Program Association Table) contained in the stream received by the receiver, a new PAT that corresponds only to the content of the channel selected by the selector among the contents of the plurality of channels, wherein
the new PAT is recorded in the recording section.

4. The content receiving device according to claim 1, further comprising:
an encryptor that encrypts, in a case where the stream received by the receiver is a non-encrypted stream, the non-encrypted stream by using the unique key of the content receiving device, wherein
the stream encrypted by the encryptor is recorded in the recording section.

5. The content receiving device according to claim 1, wherein
in a case where a compression method whereby one PES (Packetized Elementary Stream) contains one type of picture is employed as a compression method for the stream, the first decryptor decrypts only a packet located at the beginning among a plurality of packets constituting a PES.

6. The content receiving device according to claim 1, wherein
in a case were a compression method that allows one PES (Packetized Elementary Stream) to contain a plurality of types of pictures is employed as the compression method for the stream, the first decryptor sequentially performs decryption, starting from a packet located at the beginning of a plurality of packets constituting a PES, and ends the decryption for the PES upon detecting a predetermined end position.

7. The content receiving device according to claim 1, further comprising:
a detector that detects a compression method for the stream received by the receiver; and
a controller that controls the decryption performed by the first decryptor, based on a result of the detection performed by the detector, wherein
under control by the controller, the first decryptor decrypts, in a case where a compression method whereby one PES (Packetized Elementary Stream) contains one type of picture is employed as the compression method for the stream, only a packet located at the beginning of a plurality of packets constituting a PES, and
sequentially performs decryption, in a case where a compression method that allows one PES to contain a plurality of types of pictures is employed as the compression method for the stream, starting from a packet located at the beginning of a plurality of packets constituting a PES, and ends the decryption for the PES upon detecting a predetermined end position.

8. A content receiving and reproducing device comprising: the content receiving device according to claim 1.

9. A content receiving device comprising:
a receiver that receives a stream in which data of a content containing video is divided into a plurality of packets;
an extractor that extracts, in a case where the stream received by the receiver is an encrypted stream, a key for decrypting the encrypted stream from the stream;
a first decryptor that decrypts, by using the key, only a specific packet among the plurality of packets;
an information extractor that obtains predetermined information of the stream, based on data decrypted by the first decryptor; and
a processor that creates a reference file to be referred to when special reproduction of the content is performed, wherein
the first decryptor decrypts, as the specific packet, a predetermined packet containing a predetermined type of picture to be used in the special reproduction of the content,
the information extractor obtains, as the predetermined information, time information added to the predetermined packet and information indicating a position of the predetermined type of picture in the stream, and
regarding the predetermined packet, the processor creates, based on the time information, elapsed-time information indicating an elapsed time from the beginning of the content, and causes the elapsed-time information and the information indicating the position of the predetermined type of picture in the stream to be included in the reference file,
the predetermined packet contains a first predetermined packet to which first time information is added, and a second predetermined packet, which follows the first predetermined packet, and to which second time information is added, and the processor further creates, with respect to the first predetermined packet, first elapsed-time information based on the first time information, creates with respect to the second predetermined packet, second elapsed-time information based on the second time information, and creates, when a difference between a value of the first time information and a value of the second time information is greater than or equal to a predetermined threshold due to a packet loss, the first elapsed-time information and the second elapsed-time information that are continuous to each other.

10. The content receiving device according to claim 9, wherein
in a case where the stream received by the receiver is an encrypted stream, the processor causes information indicating a position of the key in the stream to be included in the reference file.

11. The content receiving device according to claim 9, wherein
in a case where the stream received by the receiver contains viewing limitation information for the content, the processor causes information indicating a position of the viewing limitation information in the strewn to be included in the reference file.

12. The content receiving device according to claim 9, wherein
in a case where the stream received by the receiver contains duplication limitation information for the content, the processor causes information indicating a position of the duplication limitation information in the stream to be included in the reference file.

13. The content receiving device according to claim 9, wherein
the processor causes information indicating a position of a PAT (Program Association Table) in the stream to be included in the reference file.

14. A content receiving method comprising the steps of:
(A) receiving a stream in which a content containing video is divided into a plurality of packets;
(B) extracting, in a case where the stream received in the step (A) is an encrypted stream, a key for decrypting the encrypted stream from the stream;
(C) decrypting, by using the key, only a specific packet among the plurality of packets;
(D) encrypting the key extracted in the step (B), by using a unique key of the content receiving device, the content receiving device being connected to a predetermined local network;
(E) recording the encrypted stream that includes the key encrypted in the step (D) in a recording section;
(F) decrypting, by using the key, the encrypted stream recorded in the recording section;
(G) creating a new stream that is suitable for the local network, based on the stream decrypted in the step (F);
(H) transmitting the new stream created in the step (G) towards another apparatus through the local network; and
(I) creating a new PMT (Program Map Table) that is suitable for the local network, based on a PMT included in the encrypted stream recorded in the recording section.

15. A non-transitory computer readable medium having a computer program recorded thereon, the computer program configured for causing a computer included in a content receiving device to perform a method, the method comprising the steps of:
(A) receiving a stream in which data of a content containing video is divided into a plurality of packets;

(B) extracting, in a case where the stream received in the step (A) is an encrypted stream, a key for decrypting the encrypted stream from the stream;
(C) decrypting, by using the key, only a specific packet among the plurality of packets;
(D) encrypting the key extracted in the step (B), by using a unique key of a content receiving device, the content receiving device being connected to a predetermined local network;
(E) recording the encrypted stream that includes the key encrypted in the step (D) in a recording section;
(F) decrypting, by using the key, the encrypted stream recorded in the recording section;
(G) creating a new stream that is suitable for the local network, based on the stream decrypted in the step (F);
(H) transmitting the new stream created in the step (G) towards another apparatus through the local network; and
(I) creating a new PMT (Program Map Table) that is suitable for the local network, based on a PMT included in the encrypted stream recorded in the recording section.

\* \* \* \* \*